United States Patent
Gaines et al.

(10) Patent No.: US 7,367,427 B2
(45) Date of Patent: May 6, 2008

(54) ACCESSORY LUBRICATION SYSTEM FOR A TURBINE PLANT

(75) Inventors: Louie T. Gaines, Phoenix, AZ (US);
Kellan P. Geck, Chandler, AZ (US);
Todd A. Langston, Chandler, AZ (US);
David M. Mathis, Phoenix, AZ (US);
Jennifer L. Zonneveld, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 701 days.

(21) Appl. No.: 10/880,827

(22) Filed: Jun. 29, 2004

(65) Prior Publication Data

US 2006/0056958 A1    Mar. 16, 2006

(51) Int. Cl.
*F01D 25/18* (2006.01)
*F01N 39/00* (2006.01)

(52) U.S. Cl. .................. 184/6.11; 184/6.21; 184/6.24; 184/66; 415/112

(58) Field of Classification Search ............... 184/6.11, 184/6.21, 6.23, 6.24, 66; 415/110, 112; 60/39.08
See application file for complete search history.

(56) References Cited

U.S. PATENT DOCUMENTS

| | | | |
|---|---|---|---|
| 2,531,411 A | 11/1950 | Davenport | |
| 3,658,153 A | 4/1972 | Berman | |
| 3,722,212 A | 3/1973 | Stein | |
| 3,740,170 A | 6/1973 | Miller | |
| 3,810,528 A | 5/1974 | Morley et al. | |
| RE30,333 E | 7/1980 | Gordon, Jr. et al. | |
| 4,391,349 A | 7/1983 | Carroll et al. | |
| 4,683,714 A | 8/1987 | Thebert | |
| 4,779,413 A | 10/1988 | Mouton | |
| 5,042,963 A * | 8/1991 | Sorenson et al. | 415/18 |
| 5,245,820 A | 9/1993 | Zalewski et al. | |
| 5,582,271 A * | 12/1996 | Mielo | 184/6.23 |
| 6,318,958 B1 | 11/2001 | Giesler et al. | |
| 6,623,238 B2 | 9/2003 | Langston et al. | |
| 7,014,419 B2 * | 3/2006 | Farnsworth et al. | 415/113 |
| 2006/0207834 A1 * | 9/2006 | Giesler et al. | 184/65 |

* cited by examiner

*Primary Examiner*—Richard Ridley
*Assistant Examiner*—James Pilkington
(74) *Attorney, Agent, or Firm*—Ingrassia Fisher & Lorenz

(57) ABSTRACT

A lubrication system for supplying lubricants between two environments is provided. The first environment is disposed within a first housing and the second environment is disposed within a second housing having a supply opening and an exhaust opening. The system includes a lubricant supply tube disposed within the supply opening and configured to supply lubricant from the first environment to the second environment. The system also includes a receptacle disposed within the second housing and configured to receive lubricant supplied from the supply tube and to hold a predetermined volume of the lubricant. A check valve is disposed within the second housing and is in fluid communication with the exhaust opening. The check valve is configured to receive overflow lubricant from the receptacle, if the lubricant exceeds the predetermined volume and to provide a seal between the first and second environments in response to a pressure differential therebetween.

22 Claims, 2 Drawing Sheets

US 7,367,427 B2

ACCESSORY LUBRICATION SYSTEM FOR A TURBINE PLANT

FIELD OF THE INVENTION

The present invention relates to a turbine plant, and more particularly, to an improved lubrication system for use in an accessory on a turbine plant.

BACKGROUND OF THE INVENTION

Turbine plant accessories, such as air turbine starters (ATS) may be mounted to a jet engine through a gearbox or other transmission assembly. These accessories typically require lubrication to operate properly. In the case of an ATS, an assisted wet cavity (AWC) design has been employed in the past to assist in supplying lubrication to the ATS. These designs include an ATS housing having a mounting face or mounting flange that is sealingly engaged with, and coupled to, the gearbox to define a porting system. The porting system allows transfer of lubricating oil between the gearbox and the starter via a "make up system", i.e., during normal operation, lubricating oil first is provided to the gearbox and may be transferred to the starter if the starter lubricant quantity is below a specific level. The lubricating oil may enter a port in the porting system that is typically in fluid communication with passages within the starter housing and may or may not be distributed to the starter.

Although AWC designs are generally effective, they have certain drawbacks. Additionally, typically the gearbox and accessory are at a pressure above ambient pressure. In the highly unlikely event of a starter housing breach and a change in pressure, the starter pressure may drop to equalize with ambient pressure, which may result in a relatively small pressure difference between the starter housing and gearbox of about 0.1-0.3 psi.

Though this pressure differential may be relatively small, excessive lubricating oil, which is fed from the gearbox to the accessory in an AWC design, may leak from the gearbox to the starter and, consequently, out through the breach. Although generally a check or reed valve has been used to counteract the potential oil loss, it has been found that because the pressure differential between the starter and gearbox can be small, these check valves may not work consistently.

Accordingly, there is a need for a lubrication system capable of providing a metered fluid flow between a turbine plant accessory and a gearbox assembly. There is also a need for a system having improved fluid flow control in the unlikely event of an accessory housing breach. Furthermore, other desirable features and characteristics of the present invention will become apparent from the subsequent detailed description of the invention and the appended claims, taken in conjunction with the accompanying drawings and this background of the invention.

SUMMARY OF THE INVENTION

A lubrication system is provided for supplying lubricants between a first environment and a second environment, wherein the first environment is disposed within a first housing and the second environment is disposed within a second housing, the second housing having a supply opening and an exhaust opening. The system comprises a lubricant supply tube, a receptacle, and a check valve. The lubricant supply tube is disposed within the supply opening and configured to supply lubricant from the first environment to the second environment. The receptacle is disposed within the second housing and configured to receive lubricant supplied from the supply tube and to hold a predetermined volume of the lubricant therein. The check valve is disposed within the second housing and in fluid communication with the exhaust opening, the check valve configured to receive overflow lubricant from the receptacle, if the lubricant exceeds the predetermined volume, and to provide a seal between the first and second environments in response to a pressure differential therebetween.

In another exemplary embodiment, an air turbine starter is provided that has a starter housing, a lubricant supply tube, a receptacle, and a check valve. The starter housing is adapted to couple to a gearbox assembly. The starter housing includes a supply opening and an exhaust opening, each configured to provide fluid communication between the gearbox assembly and the starter housing, wherein at least a portion of the gearbox assembly is at a first pressure and at least a portion of the starter housing is at a second pressure thereby generating a pressure differential therebetween. The lubricant supply tube is disposed within the supply opening and configured to extend between the gearbox assembly and starter housing, the lubricant supply tube having an inlet configured to receive lubricant from the gearbox assembly and an outlet configured to deliver lubricant to the starter. The receptacle is disposed within the starter housing and configured to receive lubricant supplied from the supply tube and to hold a predetermined volume of the lubricant. The check valve is coupled to the starter housing proximate the exhaust opening and configured to receive overflow lubricant from the receptacle, if the lubricant exceeds the predetermined volume, wherein the check valve is further configured to open or close the exhaust opening in response to the pressure differential between the starter housing and the gearbox assembly.

Other independent features and advantages of the preferred air turbine starter will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a specific type of rotating machine. Thus, although the present invention is, for convenience of explanation, depicted and described as being implemented in a turbine starter, it should be appreciated that it can be implemented in numerous other machines including, but not limited to, various generators, pumps, or other shaft driven accessories having a need for lubrication.

Figure 1:
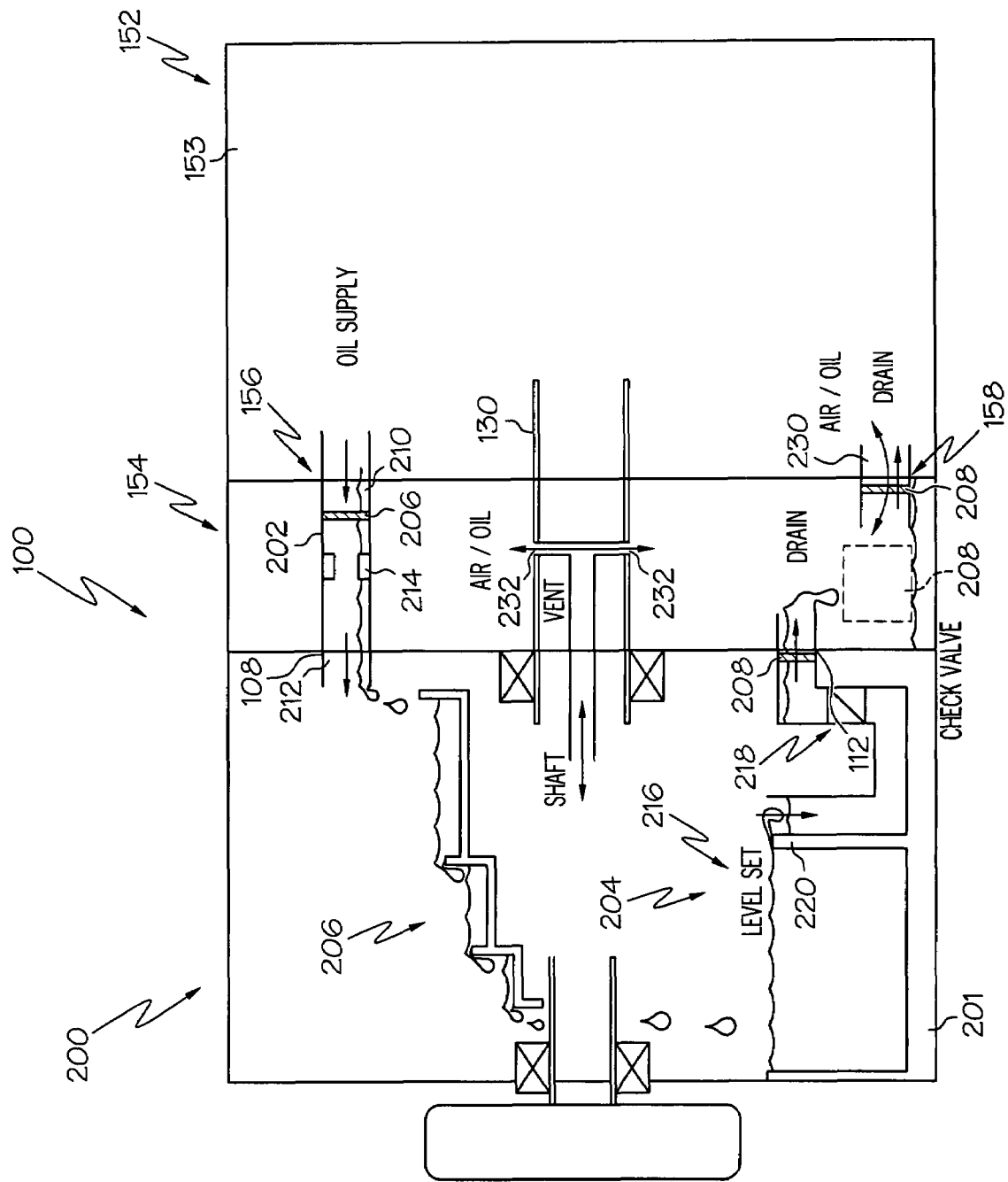
FIG. 1 is a schematic of an exemplary lubrication system.

Turning now to the description, FIG. 1 provides a schematic of an exemplary lubrication system 100. The lubrication system 100 is implemented into a gearbox 152 and a turbine plant accessory 200. The gearbox 152 and accessory 200 are coupled to one another by an intermediate housing 154. The intermediate housing 154, which may be, for example, a quick attach-detach plate, serves as an extension of the gearbox 152 and provides a buffer zone for lubricant or air that may flow between the gearbox 152 and accessory 200. However, as will be appreciated by those with skill in the art, the gearbox 152 and accessory 200 alternatively may be directly coupled to one another.

The gearbox 152 is disposed within a gearbox housing 153 and typically includes a non-illustrated lube oil supply pump that feeds clean, cool lubricant to the gearbox 152 and a plurality of passages (not shown) through which oil freely passes to supply lubrication to the gearbox 152 components. The passages are in fluid communication with oil flow passages within the accessory 200 via openings 156, 158. The lubricating oil from the gearbox 152 is preferably directed into the accessory 200 to supply lubricant to the accessory 200.

To control the lubricating oil flow, the accessory 200 includes a supply opening 108, an exhaust opening 112, a lubrication supply tube 202, a lubricant control assembly 204, and filters 206 and 208. These components are each disposed or formed in an accessory housing 201 and each will now be discussed in further detail.

The lubrication supply tube 202 is mounted within the supply opening 108 in the accessory housing 201. As appreciated by those with skill in the art, however, any suitable opening within the accessory housing 201 proximate the gearbox 152 that provides entry into the housing 201 may be employed. The lubrication supply tube 202 includes an inlet 210 and outlet 212. The inlet 210 fluidly communicates with at least one of the oil passages (not shown) within the gearbox 152 and receives lubricant from the gearbox 152 via opening 156. The outlet 212 terminates within the accessory 200 to thereby supply lubricant from the gearbox 152 to the accessory 200.

As previously discussed, the lube oil supply pump (not illustrated) in the gearbox 152 pumps lubricant through the gearbox 152 at a predetermined flow rate, thus, lubricant exits the gearbox 152 and is supplied to the accessory 200 at a predetermined flow rate. The flow rate of the supplied lubricant is preferably regulated. In an exemplary embodiment, the flow rate is regulated by the size of the lubrication supply tube inlet 210. For example, if the inlet 210 has a small diameter, less lubricant will flow into the accessory 200; however, if the inlet 210 has a large diameter, more lubricant will flow into the accessory 200. In another exemplary embodiment, the flow rate is controlled by a flow regulator 214. Any one of numerous conventional flow regulators may be employed and therefore coupled to the lubrication supply tube 202. Examples of suitable flow regulators include, but are not limited to, regulator orifices, fluidic devices, valves, and pressure regulators. In another exemplary embodiment, the lubricant flow rate is controlled to a constant magnitude. Alternatively, the flow regulator 214 may include an adjustment mechanism configured to allow an operator to customize the flow rate.

In some embodiments, the lubricant, for one reason or another, may not be clean or cool when it exits the gearbox 152. As a result, the lubricant may need to be treated before it is supplied to the accessory 200. In one example, a non-illustrated filter (discussed in detail further below) and non-illustrated heat-exchanger are coupled upstream of the lubricant supply tube outlet 212 to filter out undesired particles from the lubricant and to cool the lubricant, respectively.

After the lubricant enters the accessory 200, it is directed therethrough via a series of passages and apertures formed in the accessory 200 or located between accessory components. Gravity assists in directing the lubricant toward the lubricant control assembly 204.

The lubricant control assembly 204 regulates the supply and return of lubricant between the gearbox 152 and accessory 200. The lubricant control assembly 204 includes a receptacle 216 and a check valve assembly 218, which are each configured to provide different regulating functions.

The receptacle 216 is configured to indicate whether the amount of lubricant within the accessory 200 exceeds a predetermined threshold. In one exemplary embodiment, the receptacle 216 has at least a sidewall 220, such as a wall constructed from a standpipe, having a predetermined height that extends from the accessory housing 201. The sidewall 220 and accessory housing 201, together, define a predetermined volume. Alternatively, the receptacle 216 is a cup that is coupled to a desired section of the accessory housing 201. When the volume of lubricant collected in the receptacle 216 exceeds the volume of the receptacle 216, the excess lubricant spills over the sidewall 220 and flows toward the check valve assembly 218.

The check valve assembly 218 is mounted to a wall that is formed in the accessory housing 201. Preferably, the check valve assembly 218 operates according to a pressure differential existing between the interior portion of the gearbox 152 and the interior of the accessory 200. Thus, the exhaust opening 112 is selectively opened or closed by the check valve assembly 218 depending on the pressure differential, such as a pressure differential of below about 0.3 psi. Any one of numerous suitable check valve configurations may be employed, including, but not limited, those configurations disclosed in U.S. patent application Ser. No. 10/732,935, entitled AIR TURBINE STARTER HAVING A LOW DIFFERENTIAL CHECK VALVE, filed Dec. 10, 2003, U.S. application Ser. No. 10/788,757, entitled "PASSIVE IMPROVED AIR TURBINE STARTER LUBRICATION SYSTEM" filed on Feb. 27, 2004 and U.S. application Ser. No. 10/786,374, entitled "AIR TURBINE STARTER HAVING A FORCE BALANCED, PRESSURE ENERGIZED, WEIGHTED CHECK VALVE" filed on Feb. 24,2004, all of which are incorporated herein by reference.

The exhaust opening 112, positioned downstream of the check valve assembly 218, provides an outlet through which excess lubricant exits the accessory 200. To this end, the exhaust opening 112 can have any one of numerous configurations, such as, for example, an opening or a passage formed in the accessory housing 201, or a tube disposed within the opening or passage of the accessory housing 201.

The position of the exhaust opening 112 relative to the check valve assembly 218 facilitates the return of the lubricant to the gearbox 152. In one exemplary embodiment, such as in the embodiment depicted in FIG. 1, the exhaust opening 112 is positioned above the check valve assembly 218. The lubricant drains to and collects in the check valve assembly 218. When the pressure differential between the accessory 200 and gearbox 152 environments is about 0 psi, a pressure differential still exists due to the head of fluid over the check valve assembly 218 relative to the starter housing 102 to immerse the check valve assembly 218 in fluid or oil. Consequently, oil and/or air passes between the accessory 200 and gearbox 152 with little to no restriction.

Additionally, the lubricant freely exits the accessory 200 via the exhaust opening 112. In one exemplary embodiment, as illustrated in FIG. 1, the lubricant spills from the exhaust opening 112 into the intermediate housing 154 until a sufficient amount of lubricant pools therein and leaks back into the gearbox 152 via a lubricant return passage 230 formed in the gearbox 152.

As previously noted, the accessory 200 preferably includes a plurality of filters 206, 208 for removing particles or contaminants that may be present in the lubricant. The filters 206, 208, which can each have any one of numerous configurations, are placed along various sections of the accessory 200. In one exemplary embodiment, and as noted above, the filter 206 is placed proximate the lubrication supply tube 202. In another exemplary embodiment, the filter 206 is instead, or in addition, coupled upstream of the lubricant control assembly 204 and is a series of shelves or zones that are each configured to allow lubricant to pool therein. As the lubricant fills a first shelf or zone, gravity causes particles and contaminants in the lubricant to settle onto the shelf or zone. When an excess of lubricant is present on the shelf or zone the excess lubricant spills to the next shelf or zone and repeats the settling process.

In another exemplary embodiment, a filter 208 is coupled downstream of the lubrication control assembly 204 and lubricating oil is filtered prior to returning to the gearbox 152. In one exemplary embodiment, the downstream filter 208 is coupled to the accessory housing 201 at the exhaust opening 112. In another exemplary embodiment shown in phantom in FIG. 1, the filter 208 is positioned between the exhaust opening 112 and the lubricant return passage 230 and within the intermediate housing 154. In yet another exemplary embodiment, the filter 208 is mounted to the gearbox housing 153 and over the inlet of the lubricant return passage 230. The filter 208 may be any one of numerous types of mechanisms conventionally used for cleaning particles out of a liquid, such as a screen, a sieve, strainer, or any other filtering mechanism.

The lubricating oil is preferably sealed within the accessory 200 to prevent leakage, which may be achieved via any one of numerous means, such as, for example, using a face seal or a close clearance fit between a turbine shaft 130 and the accessory 200 components. Thus, because the accessory 200 is sealed, the accessory may have a pressure therein. Additionally, the gearbox 152 is typically sealed and has a pressure therein. Alternatively, if the intermediate housing 154 is coupled to the gearbox 152, the intermediate housing 152, via the lubricant return passage 230, has the same pressure as the gearbox 152 and acts as an extension of the gearbox 152.

Preferably, the pressure within the system containing the accessory 200, the gearbox 152, and when appropriate, the intermediate housing 154, are substantially equal to one another, however, at times, the pressure of the accessory 200 and of the gearbox 152 may become unequal. This pressure differential may affect the flow rate of the lubricant that flows to or from the accessory 200 and gearbox 152. Accordingly, it is desirable to keep the pressure between the accessory 200 or gearbox 152 equalized. Thus, at least one vent 232 is formed on the shaft 130. In one exemplary embodiment, the shaft 130 is configured to extend into the intermediate housing 154 and the vents 232 formed in that portion of the shaft 130 allow the gas to vent into the intermediate housing 154. The vent 232 may have any one of numerous configurations and may be, for example, simply an aperture, an opening, or a controllable orifice. Alternatively, the vent 232 may include a pressure regulator that is coupled thereto that responds to a pressure difference between the accessory 200 and gearbox 152 and regulates the amount of gas that exits the accessory 200. In yet another exemplary embodiment, the vent 232 may be a hole in the accessory housing 201.

Figure 2:
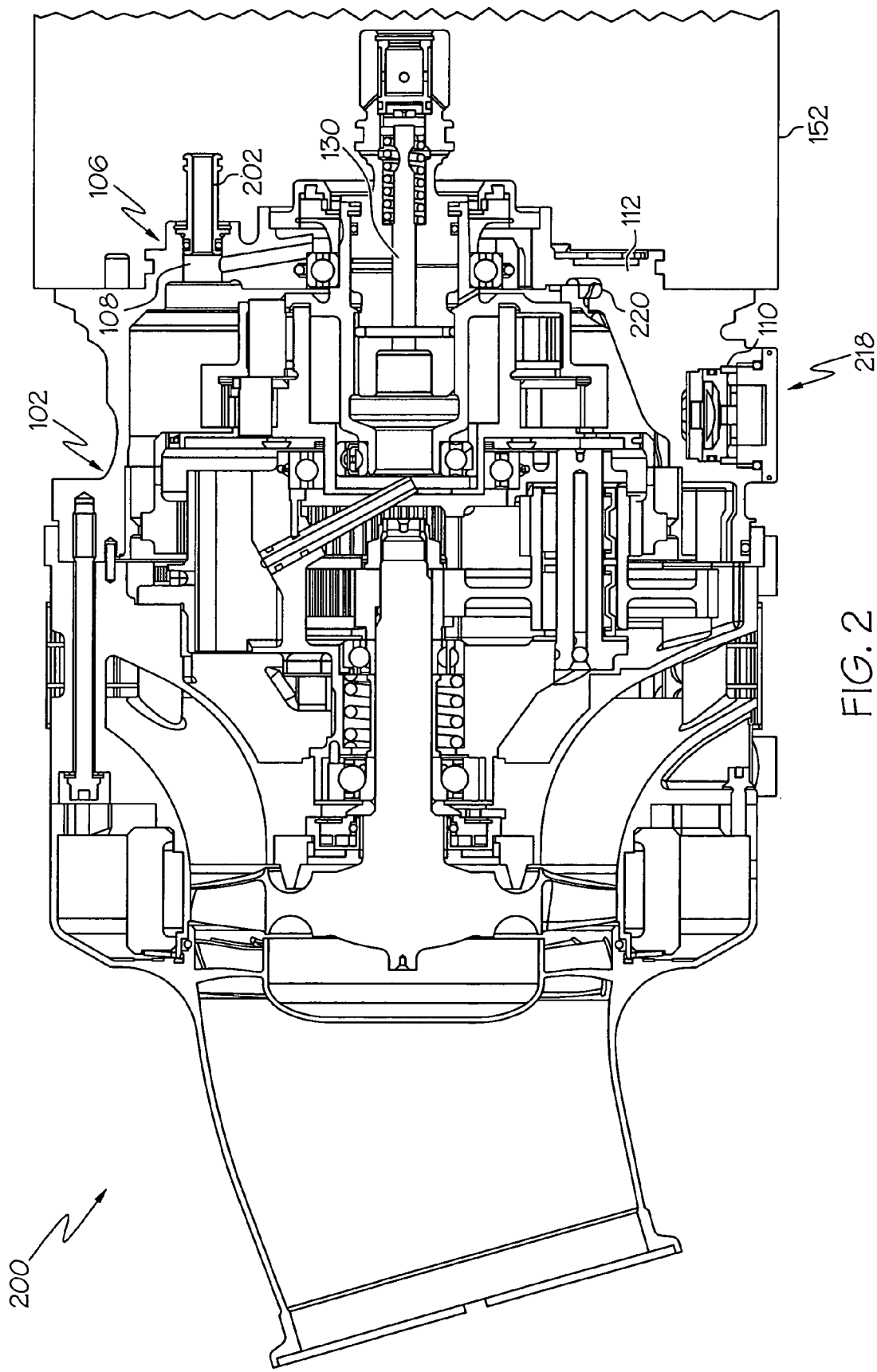
FIG. 2 is a cross sectional view of the exemplary lubrication system of FIG. 1 implemented within an air turbine starter (ATS).

The accessory 200, as has been previously mentioned, may be any one of numerous types of devices, components, or systems including, for example, an air turbine starter. Turning now to FIG. 2, an exemplary embodiment of the lubrication system 100 is illustrated as implemented in an air turbine starter 200. In the depicted embodiment, the ATS 200 is coupled to the gearbox 152. Lubricating oil from the gearbox 152 enters into the ATS 200 via the lubrication supply tube 202, which is mounted in the supply opening 108 that is proximate the gearbox 152. The oil flows through a series of non-illustrated filters into the standpipe 220. Once the standpipe 220 is filled, the excess oil spills to the check valve assembly 218.

The check valve assembly 218 is located towards the outer periphery of the ATS housing 201 and mounted within a valve opening 110. Although the check valve assembly 218 is shown to be positioned towards the outer periphery of the ATS housing 201, as will be appreciated by those skilled in the art, the assembly 218 can be located at any position to allow fluid communication between the ATS 200 and the gearbox 152. For instance, the ATS housing 201 may include additional walls or cover plates that may cover certain ATS components within which valve openings may be formed. Thus, the check valve assembly 218 can be placed in or over a wall or cover plate opening that may be mounted on the ATS housing 201. Moreover, although the illustration depicts one valve opening 110, more than one valve opening between the ATS 200 and gearbox 152 may be employed. In the case of more than one valve opening, either the same number of check valve assemblies or a check valve assembly used in conjunction with other valve assemblies will typically be employed. When the oil level reaches at least the exhaust opening 112, the oil exits the ATS 200 via the opening 112.

Thus, a lubrication system having an improved fluid flow control has been provided. The system can be implemented into an accessory of a gearbox, such as, for example an air turbine starter. The system can also implemented into any generator, pump, or shaft-driven accessory that may need lubrication from a gearbox. The lubrication system may be used under the conditions of an accessory housing puncture and in particular, in instances when the breach causes a low pressure differential between the accessory and gearbox.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A lubrication system for supplying lubricant between a first environment and a second environment, wherein the first environment is disposed within a first housing and the second environment is disposed within a second housing, the second housing having a supply opening and an exhaust opening, the system comprising:

a lubricant supply tube disposed within the supply opening and configured to supply lubricant from the first environment to the second environment;

a receptacle disposed within the second housing and configured to receive lubricant supplied from the supply tube and to hold a predetermined volume of the lubricant therein; and a check valve disposed within the second housing and in fluid communication with the exhaust opening, the check valve configured to receive overflow lubricant from the receptacle, if the lubricant exceeds the predetermined volume, and to provide a seal between the first and second environments in response to a pressure differential therebetween.

2. The system of claim 1, further comprising:
a flow regulator coupled to the supply tube and configured to regulate a rate at which the lubricant flows from the first environment to the second environment.

3. The system of claim 2, wherein the flow regulator comprises at least one regulator orifice.

4. The system of claim 1, further comprising:
a shaft having a first portion disposed within the second housing and a second portion extending out of the second housing; and
an aperture formed in the second portion of the shaft.

5. The system of claim 4, wherein the aperture is in communication with the first and the second environments and configured to respond to a pressure difference therebetween.

6. The system of claim 1, wherein the exhaust opening is configured to receive the overflow lubricant from the check valve and provide an outlet for the overflow lubricant out of the second environment.

7. The system of claim 1, further comprising a third environment disposed within a third housing, wherein the third housing is coupled between the first housing and the second housing.

8. The system of claim 1, wherein the lubricant includes contaminants, and wherein the system further comprises:
a filter coupled to the supply tube and configured to remove at least a portion of the contaminants from the lubricant.

9. The system of claim 1, wherein the lubricant includes contaminants, and wherein the system further comprises:
a filter disposed within the second housing and in fluid communication with the supply tube to thereby remove at least a portion of the contaminants from the lubricant before the lubricant is received by the check valve.

10. The system of claim 9, wherein the filter is a plurality of shelves, each shelf configured to allow the contaminants in the lubricant to settle thereon.

11. The system of claim 1, wherein the lubricant includes contaminants, the system further comprising:
a filter coupled to the return opening to thereby remove at least a portion of the contaminants from the lubricant.

12. An air turbine starter, comprising:
a starter housing adapted to couple to a gearbox assembly, the starter housing including a supply opening and an exhaust opening, each configured to provide fluid communication between the gearbox assembly and the starter housing, wherein at least a portion of the gearbox assembly is at a first pressure and at least a portion of the starter housing is at a second pressure thereby generating a pressure differential therebetween;
a lubricant supply tube disposed within the supply opening and configured to extend between the gearbox assembly and starter housing, the lubricant supply tube having an inlet configured to receive lubricant from the gearbox assembly and an outlet configured to deliver lubricant to the starter;
a receptacle disposed within the starter housing and configured to receive lubricant supplied from the supply tube and to hold a predetermined volume of the lubricant; and
a check valve coupled to the starter housing proximate the exhaust opening and configured to receive overflow lubricant from the receptacle, if the lubricant exceeds the predetermined volume, wherein the check valve is further configured to open or close the exhaust opening in response to the pressure differential between the starter housing and the gearbox assembly.

13. The air turbine starter of claim 12, further comprising:
a shaft having a first portion disposed within the starter housing and a second portion extending from the starter housing, wherein the starter housing is axially mounted to the shaft; and
an aperture formed in the second portion of the shaft.

14. The air turbine starter of claim 13, wherein the aperture is in communication with the first and the second environments and configured to respond to a pressure difference therebetween.

15. The air turbine starter of claim 12, further comprising:
a flow regulator coupled to the supply tube and configured to regulate a rate at which the lubricant flows between the gearbox assembly and starter housing.

16. The air turbine starter of claim 15, wherein the flow regulator comprises at least one regulator orifice.

17. The air turbine starter of claim 12, wherein the exhaust opening is configured to receive the overflow lubricant from the check valve and provide an outlet for the overflow lubricant out of the starter.

18. The air turbine starter of claim 12, further comprising an intermediate environment disposed within an intermediate housing, the intermediate housing having a first side coupled to the starter and a second side configured to couple to the gearbox assembly.

19. The air turbine starter of claim 18, wherein the intermediate housing includes an inlet opening configured to substantially align with the exhaust opening of the starter housing.

20. The air turbine starter of claim 12, wherein the lubricant includes contaminants, and wherein the system further comprises:
a filter coupled to the supply tube and configured to remove at least a portion of the contaminants from the lubricant.

21. The air turbine staffer of claim 12, wherein the lubricant includes contaminants, and wherein the system further comprises:
a filter disposed within the staffer housing and in fluid communication with the supply tube to thereby remove at least a portion of the contaminants from the lubricant before the lubricant is received by the check valve.

22. The air turbine staffer of claim 12, wherein the lubricant includes contaminants, and wherein the system further comprises:
a filter coupled to the exhaust opening to thereby remove at least a portion of the contaminants from the lubricant.

* * * * *